Aug. 8, 1944.  K. POWERS  2,355,393
PLANTER ATTACHMENT
Filed Dec. 12, 1941  3 Sheets-Sheet 1

Inventor
KELLY POWERS,

By *Clarence A. O'Brien*

Attorney

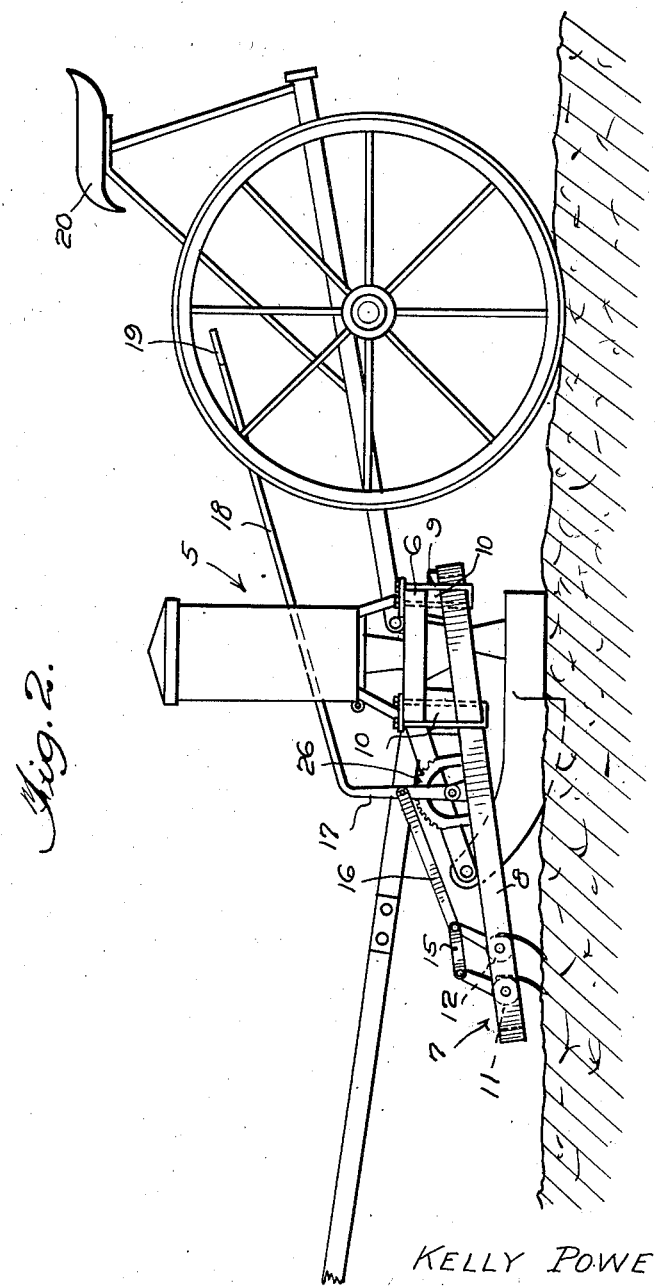

Aug. 8, 1944.　　　　K. POWERS　　　　2,355,393
PLANTER ATTACHMENT
Filed Dec. 12, 1941　　　　3 Sheets-Sheet 3
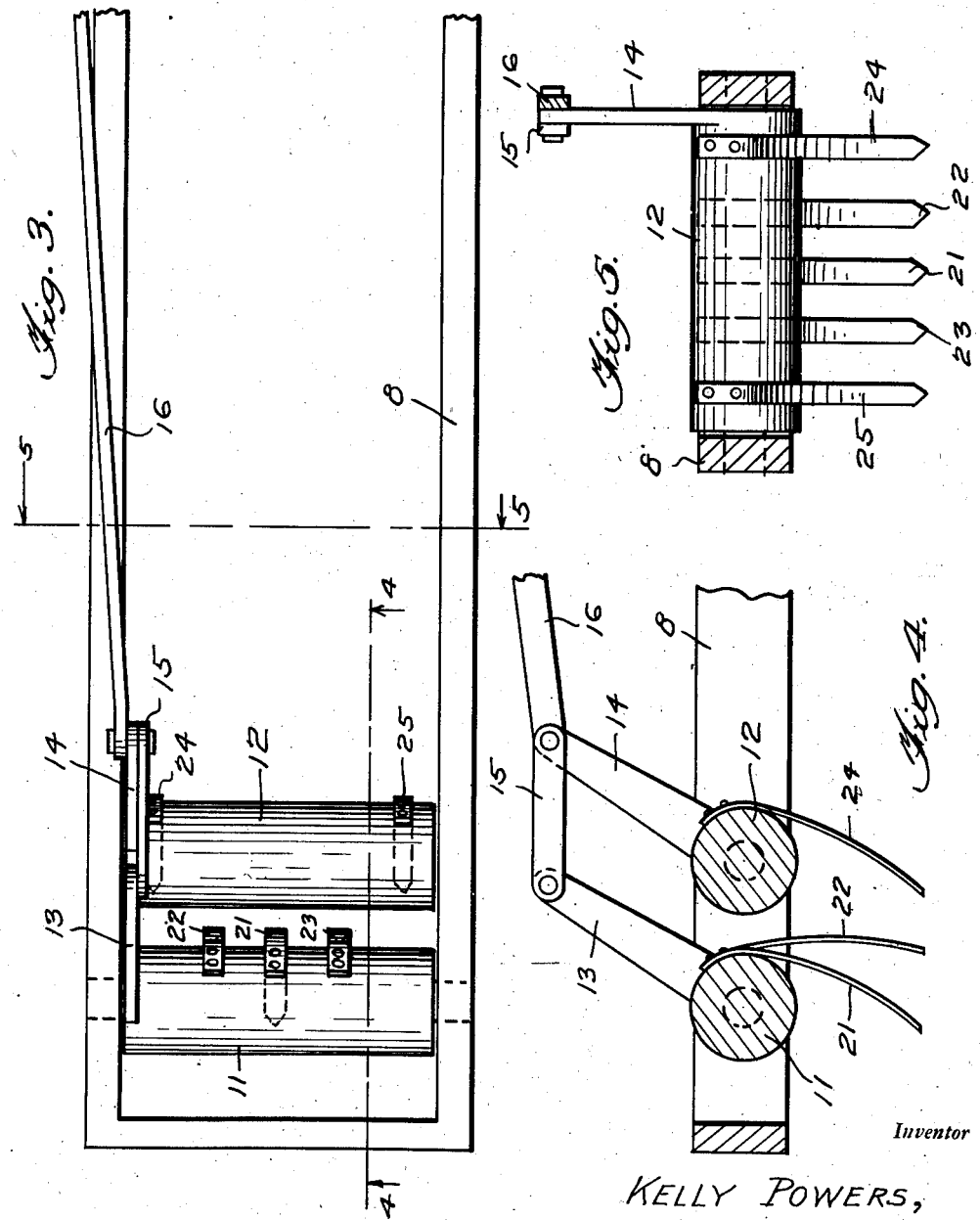
Inventor
KELLY POWERS,
By Clarence A. O'Brien
Attorney Patented Aug. 8, 1944

2,355,393

UNITED STATES PATENT OFFICE 2,355,393

PLANTER ATTACHMENT

Kelly Powers, Lagrange, Ind.

Application December 12, 1941, Serial No. 422,740

1 Claim. (Cl. 97—5)

This invention relates to new and useful improvements in agricultural machines and more particularly to an attachment for planters devised to fill in hoof prints and other shallow depressions in the ground in advance of planting.

The principal object of the present invention is to provide a ground evener attachment for planters and other types of agricultural machinery which can be applied in a quick and convenient manner to various conventional frames and which in no degree requires any modification of conventional agricultural machine construction.

Other objects and advantages of the invention will become apparent to the reader of the following description.

In the drawings—

Figure 2 is a side elevational view.

Figure 3 is a fragmentary top plan view of one of the units.

Figure 4 is a section on line 4—4 of Figure 3.

Figure 5 is a transverse sectional view taken substantially on line 5—5 of Figure 3.

Figure 1:
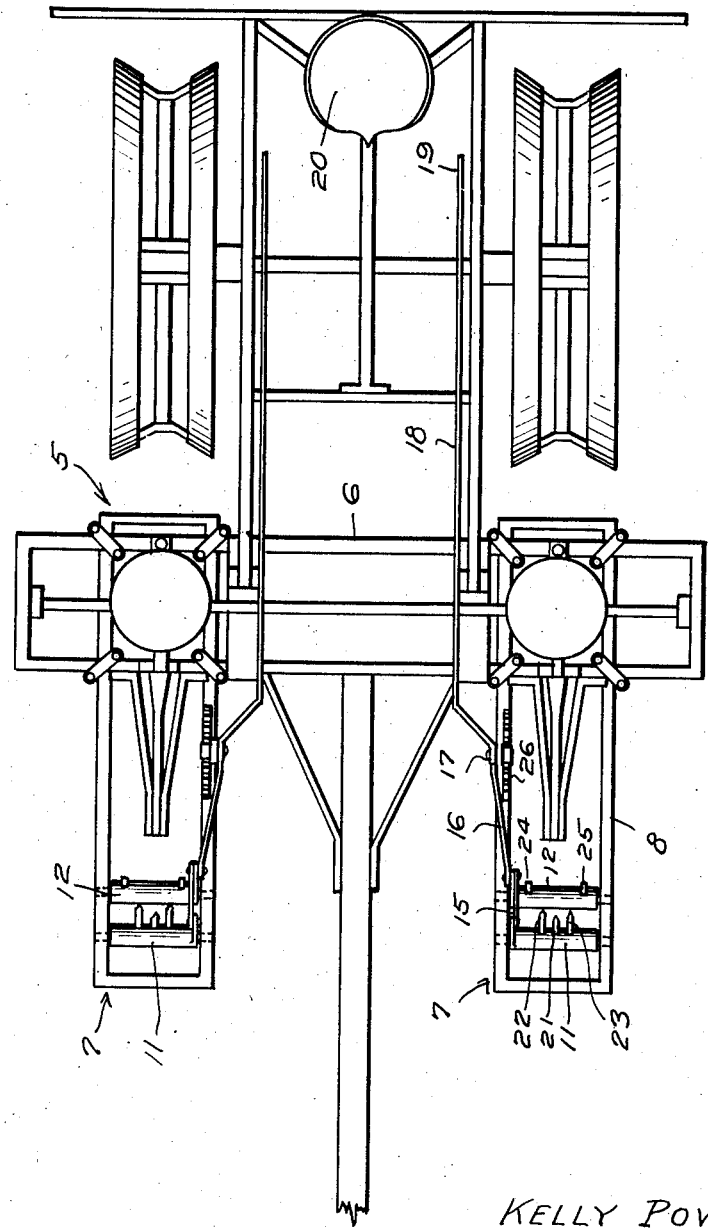
Figure 1 represents a top plan view showing a pair of the attachments secured to a planter.

Referring to the drawings wherein like numerals designate like parts, it can be seen that numeral 5 generally refers to a conventional planter which includes a main cross-frame 6 to which the present invention is attached.

Figure 1 shows a pair of the units which make up the present invention and as both are identical in construction a description of one will suffice.

The present invention is generally referred to by numeral 7 and preferably includes a rectangular-shaped frame 8, the rear end portion of which is secured to the side members of the main cross frame 6 by U clamps 9 and, as is shown in Figure 2, blocks 10 or other spacing means may be interposed between frame 8 and the overlying portion of the main frame 6 to give the proper inclined set to the frame 8, as is clearly shown in Figure 2.

The frame 8 projects forwardly, dipping toward the ground, as shown in Figure 2, and within the confines of the forward portion of the frame 8 are the ground-engaging elements. One embodiment of the ground-engaging elements is shown in Figures 3, 4 and 5 and comprises a pair of rolls 11, 12 spanning the side members of the frame 8, these rolls 11, 12 having levers 13, 14, respectively, rising from a pair of adjacent ends thereof. A pivotal link 15 connects the upper ends of the levers 13, 14 and from the upper end of the lever 14 and pivotally secured thereto is an elongated connecting rod 16 which at its rear pivotally connects to a control arm 17 from which rearwardly extends a control rod 18 terminating in a handle 19 adjacent the usual driver's seat 20.

Secured to the periphery of the roll 11 are three closely spaced tines 21, 22 and 23. The tine 21 is substantially longer than the tines 22, 23 and projects more forwardly than the tines 22 and 23, the purpose being that it rides the soil in advance of the tines 22, 23.

The roll 12 has tines 24, 25 at the end portion thereof, these tines being more greatly spaced than the space between the tines 22, 23. The tines all go together to form a spread for taking in an area substantially as wide as the frame 8.

On the frame 8 is a quadrant rack 26 and the arm 17 may carry a suitable detent for riding engagement therewith. Obviously by operating the control rod 18 the rolls 11 and 12 can be properly set with their tines biting the ground to the desired depth. Obviously the tines can be entirely withdrawn from the soil whenever desired.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

A soil evener attachment for agriculture machines comprising a frame including a pair of side members, a pair of front and rear rolls rotatably mounted and interposed between said side members, a series of closely spaced tines depending from the front roll including a central tine inclining forwardly of the other tines of the series, a pair of tines depending from the rear rolls and spaced outside said series of tines, said rolls being provided with upstanding arms, a control member, the upper ends of the arms being pivotally connected to the control member, a quadrant rack mounted on the frame, a lever provided with a detent cooperative with the rack and to which one end of the control member is pivotally connected.

KELLY POWERS.